R. W. EATON.

Spoke-Tenoning Machine.

No. 8,691. Reissued April 29, 1879.

Witnesses

Geo. H. Strong

Frank A. Brooks

Inventor

Robert W. Eaton by Dewey & Co.

Attys

N. PETERS, PHOTO-LITHOGRAPHER, WASHINGTON, D. C.

UNITED STATES PATENT OFFICE.

ROBERT W. EATON, OF WATSONVILLE, CALIFORNIA.

IMPROVEMENT IN SPOKE-TENONING MACHINES.

Specification forming part of Letters Patent No. 200,649, dated February 26, 1878; Reissue No. 8,691, dated dated April 29, 1879; application filed May 16, 1878.

*To all whom it may concern:*

Be it known that I, ROBERT W. EATON, of Watsonville, county of Santa Cruz, and State of California, have invented an Improved Spoke-Tenon Auger; and I do hereby declare the following to be a full, clear, and exact description thereof, reference being had to the accompanying drawings.

My invention relates to certain improvements in that class of spoke-tenoning machines which are intended to be clamped to the spoke while the tenon is being made; and it consists in a novel construction of the cutter-head, and in a means for adjusting and centering it upon the spoke.

It also consists in novel means for adjusting the mandrel of the tenon-auger by means of swivel supporting-rings and operating-screws, by which either end may be adjusted independent of the other, and any desired angle obtained.

Figure 1:
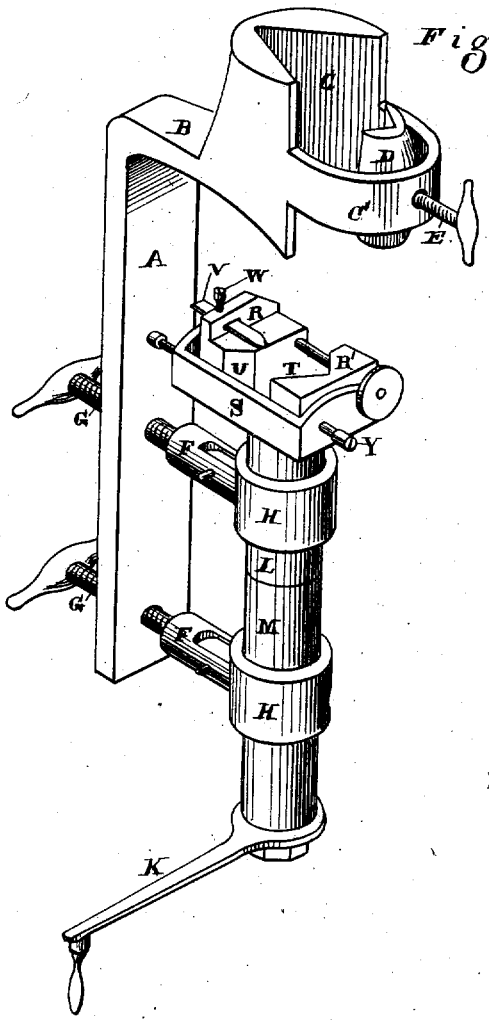
Figure 2:
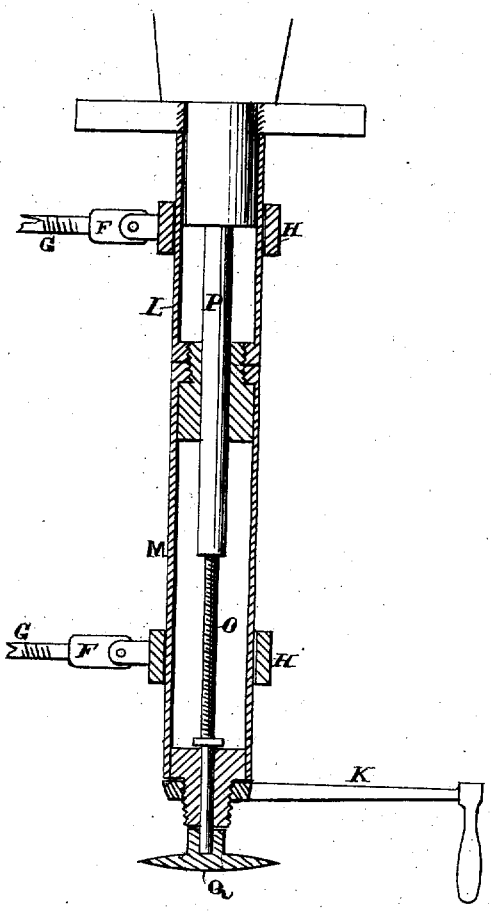

Referring to the accompanying drawings for a more complete explanation of my invention, Figure 1 is a perspective view of my invention. Fig. 2 is a sectional view of the same.

A is the bar which supports the boring-auger and by which it is secured to the spoke while the tenon is being formed. This bar is bent at right angles, as shown at B, and has the V-shaped groove C formed in the enlarged face of this portion, so as to clasp one side of the spoke. A stout loop or bail, C′, forms an arch from one side of the V-shaped groove to the other, and a block, D, is fitted into this arch, so that a V-shaped groove in its face stands opposite the V-shaped groove C. These serve to clasp the spoke, and a screw, E, passing through the bail, may be turned to force the block D inward, and thus clamp the spoke securely in the double V-shaped groove formed between the two faces. The block D is so mounted that it will adjust itself to the taper of the spoke when secured. Through the bar A two screws, G, pass at right angles with it and the spoke, and these screws have enlarged slotted ends F, into which the lugs or projections from two rings, H, enter, and are secured by a pin or pivot, so as to form a hinge-joint, as shown. The rings H serve to hold and guide the auger-mandrel M, and it will be seen that by means of the adjusting-screws G one end of the mandrel or the other may be moved so as to give an independent adjustment to either end, and thus the mandrel may be set at any required distance from the bar A, and also at an angle, as the hinge-joints in F will allow of independent adjustments of the ends. A perfect alignment with the spoke is thus insured.

The mandrel is hollow and made in two parts, preferably of gas-pipe, screwed together, and the part M has a plug screwed or made fast into each end. Through one end the bar or rod O passes, extending from the interior of the part M through the plug into the part L, which supports the cutter-head. A larger rod or stem, P, passes through the plug in the outer end of the mandrel, and has neck or collars to prevent it from advancing. It has a screw-thread cut upon it within the mandrel, and screws onto the rod O, so that by turning the head Q on the outer end the rod O may be advanced in either direction. By this means the gage is formed and the length of the tenon is determined and regulated.

The tenon-auger is secured to the end L of the mandrel, and by means of the crank K the mandrel and auger are turned, the auger cutting the tenon upon the spoke until the end of the bar O strikes the end of the spoke and prevents cutting any farther, as before described.

The auger or cutter-head itself consists of two blocks, R R′, fitted to slide in the guides S, so as to move to or from each other, as shown.

One of these blocks, R, carries the knife V, which is secured to it by a set-screw, W, and the face or portion of the block which is opposite to the block R has one side beveled off, as shown at U, so as to make a sort of V-shaped projection. The other block, R′, has a V-shaped notch, T, formed in its face, opposing the block R, so that the tenon entering between these two blocks has three points of support—namely, the surface of the block R, formed by cutting off the incline U, and the two sides of the V-shaped notch T. As different sizes of tenon are cut, it will be seen that the points of support formed by the sides of the notch T must be advanced more than the single face U in order to keep the spoke and tenon in the center. Set-screws Y Y are turned up against the back, and support and steady the blocks while a cut is being made.

The operation will thus be to first prepare the spokes in the wheel in the usual manner, after which my machine is secured to each spoke successively. The cutter-head being adjusted by setting the blocks R R′ at a suitable distance apart to form the desired size of tenon, and the rod O being set to gage its length, it will only be necessary to turn the crank K and rotate the cutter-mandrel until the end of the rod O comes in contact with the end of the spoke, when the tenon will be finished.

Having thus described my invention, I do not claim, broadly, the method shown for securing the machine to the spoke, nor do I claim an adjusting device to move the whole length of the mandrel at once in the same direction; but

What I do claim as new, and desire to secure by Letters Patent, is—

1. The cutter-head consisting of the blocks or heads R R′, adjustable in the guide or frame S, one having the V-shaped groove T and the other the V-shaped projection U, combined and arranged to operate substantially as herein described.

2. The bar A, secured to the spoke, as shown, and having the screws G, with their slotted heads F, in combination with the swiveled rings H, supporting the barrel or hollow mandrel L M, and serving to adjust either end independent of the other, substantially as shown, and for the purpose herein described.

3. The gage for the length of the tenon, consisting of the rod O, moving inside the hollow mandrel M, as shown, and adjusted by means of the screw-stem P and the head or thumb-nut Q, substantially as herein described.

In witness whereof I hereunto set my hand and seal.

ROBERT W. EATON. [L. S.]

Witnesses:

J. J. DESMOND,

L. D. HOLBROOK.